United States Patent
Pan et al.

(10) Patent No.: US 10,069,797 B2
(45) Date of Patent: Sep. 4, 2018

(54) 10GBPS LINE RATE STREAM TO DISK WITH FAST RETRIEVAL (METADATA) AND NETWORK STATISTICS

(71) Applicant: Fluke Corporation, Everett, WA (US)

(72) Inventors: Arong Pan, Beijing (CN); Liang Zhang, Beijing (CN); Shiguang Pan, Beijing (CN)

(73) Assignee: Fluke Corporation, Everett, WA (US)

(*) Notice: Subject to any disclaimer, the term of this patent is extended or adjusted under 35 U.S.C. 154(b) by 192 days.

(21) Appl. No.: 15/014,492

(22) Filed: Feb. 3, 2016

(65) Prior Publication Data

US 2016/0226826 A1    Aug. 4, 2016

(30) Foreign Application Priority Data

Jan. 9, 2015    (CN) .......................... 2015 1 0011673

(51) Int. Cl.
*H04L 29/06*    (2006.01)
*H04L 29/08*    (2006.01)
(Continued)

(52) U.S. Cl.
CPC .... *H04L 63/0254* (2013.01); *G06F 17/30312* (2013.01); *H04L 43/026* (2013.01); *H04L 43/028* (2013.01); *H04L 63/0245* (2013.01); *H04L 63/1408* (2013.01); *H04L 63/1441* (2013.01); *H04L 67/1095* (2013.01); *H04L 69/22* (2013.01)

(58) Field of Classification Search
CPC .................................................. H04L 63/0254
USPC ......................................................... 709/224
See application file for complete search history.

(56) References Cited

U.S. PATENT DOCUMENTS

| | | | | |
|---|---|---|---|---|
| 2007/0006293 | A1* | 1/2007 | Balakrishnan ...... | H04L 63/0245 726/13 |
| 2008/0024609 | A1* | 1/2008 | Konishi ................ | H04N 5/232 348/159 |
| 2010/0325178 | A1* | 12/2010 | Won ....................... | H04L 43/12 707/812 |

FOREIGN PATENT DOCUMENTS

EP    1788490 A1    5/2007

OTHER PUBLICATIONS

Partial European Search Report for European Patent Application No. 16150551.6, dated Aug. 8, 2016.
(Continued)

*Primary Examiner* — David Lazaro
*Assistant Examiner* — Zia Khurshid
(74) *Attorney, Agent, or Firm* — Locke Lord LLP; Scott D. Wofsy; Christopher J. Capelli (57) ABSTRACT

This application discloses a network monitoring method and apparatus. The network monitoring method includes: receiving a packet transmitted on a network, where the packet has flow information that indicates a network flow for transmission of the packet; acquiring the flow information of the packet; detecting whether a metadatabase includes the flow information corresponding the packet, where the metadatabase is used to store metadata and flow information associated with the metadata; generating, according to a detection result about the flow information, metadata related to the transmission of the packet, and associating the metadata with the corresponding flow information; and storing the generated metadata and the flow information associated with the generated metadata into the metadatabase.

18 Claims, 3 Drawing Sheets

(51) Int. Cl.
*G06F 17/30* (2006.01)
*H04L 12/26* (2006.01)

(56) References Cited

OTHER PUBLICATIONS

Extended European Search Report for European Patent Application No. 16150551.6, dated Nov. 14, 2016.

* cited by examiner

10GBPS LINE RATE STREAM TO DISK WITH FAST RETRIEVAL (METADATA) AND NETWORK STATISTICS

TECHNICAL FIELD

This application relates to the field of communications technologies, and in particular, to a network monitoring method and apparatus, and a packet filtering method and apparatus.

BACKGROUND ART

Applications of new information technologies such as cloud computing, high definition video communication, and databases greatly promote the development of communications technologies, for example, high-speed network communications technologies such as 10 Gbps Ethernet technologies are therefore widely applied. However, as the transmission rate improves significantly, it becomes more difficult to monitor and manage a high-speed communications network.

To acquire sufficient information from a network, during network monitoring, packets transmitted on the network need to be captured, and the captured packets need to be analyzed, to achieve objectives such as network fault locating, intrusion detection, traffic statistics, and network security and reliability assurance. However, an existing network monitoring and analysis device generally cannot effectively support packet acquisition at a high transmission rate such as 10 Gbps, because at a high transmission rate, packets will be lost, and the packet loss affects the accuracy of data analysis. In addition, in many application scenarios, packets transmitted on the network further need to be stored, to facilitate subsequent analysis and comparison processing. The requirement of storing packets further increases the processing pressure of the network monitoring and analysis device.

SUMMARY OF THE INVENTION

An objective of this application is to provide a method that can capture a network packet at a high transmission rate and at the same time, can acquire elated information of the packet.

An aspect of this application discloses a network monitoring method. The monitoring method includes: receiving a packet transmitted on a network, where the packet has flow information that indicates a network flow for transmission of the packet; acquiring the flow information of the packet; detecting whether a metadatabase includes the flow information corresponding the packet, where the metadatabase is used to store metadata and flow information associated with the metadata; generating, according to a detection result about the flow information, metadata related to the transmission of the packet, and associating the metadata with the corresponding flow information; nation; and storing the generated metadata and the flow information associated with the generated metadata into the metadatabase.

It can be seen that, in the network monitoring method according to this application, packet transmission is described by using metadata, and a size of the metadata is generally much smaller than a packet size. When packets need to be monitored, for example, when statistics about information such as transmission status of the packets are collected or packets are filtered. According to a particular algorithm, a network monitoring apparatus needs to process the metadata only, and does not need to or rarely needs to process the packets directly. Such a data analysis processing manner significantly reduces the difficulty of analysis processing on network packets, thereby improving the efficiency and reliability of network monitoring.

In some embodiments, the step of generating, according to a detection result about the flow information, metadata related to the transmission of the packet includes: if it is detected that the metadatabase does not include the flow information corresponding to the packet, extracting, from the packet, data related to the transmission of the packet to generate the metadata; and if it is detected that the metadatabase includes the flow information corresponding to the packet, replicating, from the metadatabase, metadata associated with the flow information, and using the replicated metadata as the metadata of the packet.

In some embodiments, the step of extracting, from the packet, data related to the transmission of the packet to generate the metadata includes: replicating and/or processing at least a part of a header of the packet to obtain the metadata of the packet.

In some embodiments, the processing at least a part of a header of the packet includes converting at least some data included in the header of the packet by using one or more predetermined conversion functions.

In some embodiments, the associating the metadata with the corresponding flow information includes: adding the flow information to the generated metadata.

In some embodiments, the received packet is one of multiple packets transmitted on the network, and the network monitoring method includes: receiving the multiple packets, and generating, according to metadata corresponding to the multiple packets, network statistics information for the multiple packets.

In some embodiments, the network statistics information includes a source address and a destination address, a source port and a destination port, a source domain identifier, a destination domain identifier, a service type identifier, a packet flow direction, a protocol identifier, a VLAN identifier, a packet count, and/or a packet size.

In some embodiments, the network monitoring method further includes: storing the packet in a packet library, where the packet is allocated with the generated metadata in the metadatabase.

In some embodiments, the step of storing the generated metadata and the flow information associated with the generated metadata into the metadatabase includes: buffering the generated metadata of the packet and the flow information associated with the generated metadata into a buffer memory; and a synchronously transferring, from the buffer memory into the metadatabase, the buffered metadata and associated flow information of the packet, and buffered metadata and associated flow information of other packets.

In some embodiments, the received packet is one packet in a group of packets transmitted on the network, and the network monitoring method includes: receiving the group of packets; and if each packet in the group of packets is allocated with corresponding metadata in the metadatabase, adding, to the group of packets, a block tag indicating that each packet is allocated with corresponding metadata.

In some embodiments, the network monitoring method further includes: using a metadata filter to filter the group of packets having the block tag indicating that each packet is allocated with corresponding metadata.

In some embodiments, the metadata includes a source address-destination address pair, a source port-destination port pair, a source-end sub-network identifier, a destination-end sub-network identifier, a packet flow direction, a service type identifier, a protocol identifier, an application identifier and/or a VLAN identifier.

In some embodiments, the flow information includes a source address-destination address pair.

In some embodiments, the flow information further includes a source port-destination port pair.

Another aspect of this application further discloses a method for filtering at least one group of packets transmitted on a network. The method includes: providing a metadata filter and a packet filter, where the packet filter is associated with the metadata filter; for each group of packets in the at least one group of packets, detecting whether the group of packets has a block tag, where the block tag indicates that the group of packets is allocated with metadata that is related to transmission of each packet in the group; and using, according to a detection result about the block tag, the metadata filter or the packet filter to filter the at least one group of packets.

In some embodiments, the step of using, according to a detection result about the block tag, the metadata filter or the packet filter to filter the at least one group of packets includes: if it is detected that a group of packets in the at least one group of packets is allocated with a group of metadata, using the metadata filter to filter the group of packets; and if it is detected that a group of packets in the at least one group of packets is not allocated with a group of metadata, using the packet filter to filter the group of packets.

In some embodiments, each group of packets in the at least one group of packets has a data block header, and the block tag indicating that each packet is allocated with corresponding metadata is added to the data block header.

In some embodiments, the at least one group of packets is indexed by using a packet block index, and the block tag is further added to the packet block index.

In some embodiments, the method further includes: acquiring filtered packets from the at least one group of packets.

In some embodiments, the packet filter has at least one predetermined filter criterion that is corresponding to and interconvertible with at least one filter criterion in the metadata filter.

Another aspect of this application further discloses a method for filtering at least one packet transmitted on a network. The method includes: providing a metadata filter and a packet filter, where the packet filter is associated with the metadata filter; for each packet in the at least one packet, detecting whether the packet has corresponding metadata; and using, according to a detection result about the metadata, the metadata filter or the packet filter to filter the at least one packet.

Another aspect of this application further discloses a network monitoring apparatus. The network monitoring apparatus includes: a receiving apparatus, configured to receive a packet transmitted on a network, where the packet has flow information that indicates a network flow for transmission of the packet; a flow information acquiring apparatus, configured to acquire the flow information of the packet; a detection apparatus, configured to detect whether a metadatabase includes the flow information corresponding to the packet, where the metadatabase is used to store metadata and flow information associated with the metadata; a metadata generation apparatus, configured to generate, according to a detection result about the flow information, metadata related to the transmission of each packet in the at least one packet, and associate the metadata with corresponding flow information; and a storage apparatus, configured to store the generated metadata and the flow information associated with the generated metadata into the metadatabase.

Another aspect of this application further discloses an apparatus for filtering at least one group of packets transmitted on a network. The apparatus includes: a metadata filter; a packet filter, where the packet filter is associated with the metadata filter; a tag detection apparatus, configured to: for each group of packets in the at least one group of packets, detect whether the group of packets has a block tag, where the block tag indicates that the group of packets is allocated with metadata that is related to transmission of each packet in the group; and a filter selection apparatus, configured to use, according to a detection result about the block tag, the metadata filter or the packet filter to filter the at least one group of packets.

This application is summarized above, and details may be simplified, generalized and omitted, Therefore, those skilled in the art should realize that, this part is merely an exemplary description, and is not intended to limit the scope of this application in any manner. This summary part is neither intended to determine the key features or necessary features of the claimed subject, nor intended to serve as an auxiliary means for determining the scope of the claimed subject.

BRIEF DESCRIPTION OF THE DRAWINGS

The foregoing and other features of the content of this application will be comprehended more thoroughly and clearly through the following specification and the appended claims with reference to the accompanying drawings. It can be understood that, these drawings only show several implementation manners of the content of this application, and therefore, should not be construed as a limitation to the scope of the content of this application. Through the accompanying drawings, the content of this application will be described more clearly and in further detail.

DETAILED DESCRIPTION

In the following detailed description, reference is made to the accompanying drawings that serve as a part of the description. In the accompanying drawings, unless otherwise specified in the context, similar symbols usually represent similar components. The specific implementation manners, the accompanying drawings, and exemplary implementation manners described in the claims are not intended for limitation. Other implementation manners may be used and other changes may be made without departing from the spirit or scope of the subject of this application. It can be understood that, various configurations, replacements, combinations, and design of different components may be carried out for various aspects of the content of this application that are generally described in the specification and illustrated in the accompanying drawings, and all these configurations, replacements, combinations, and design definitely constitute a part of the content of this application.

Figure 1:
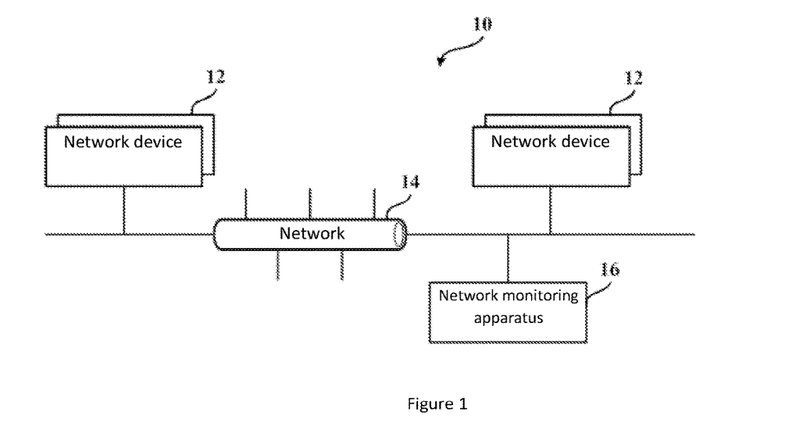
FIG. 1 is a schematic diagram of a network system 10 in which a network monitoring apparatus of this application can be applied.

FIG. 1 is a schematic diagram of a network system 10 in which a network monitoring apparatus of this application can be applied.

As shown in FIG. 1, the network system 10 includes multiple network devices 12; these network devices 12 communicate with each other through a network 14, and send data to and receive data from each other. Data transmitted on the network 14 may take a form of a packet (packet), and these packets may use same or different communication transport protocols, and have same or different data formats. Each of these packets has a header that includes information about data and transmission of the packet. By using the information about transmission of the packet in the header, the network 14 can send the packet from a source network device to a destination network device by using, for example, a router. For example, for a packet that uses the TCP/IP protocol, a header of the packet includes a source address and source port of a source network device, and a destination port and destination address of a destination network device.

A network monitoring apparatus 16 is coupled to the network 14 and is used to monitor data information transmitted on the network 14. For example, the network monitoring apparatus 16 can capture packets, and analyze the captured packets by using a packet analysis engine. In some embodiments, the network monitoring apparatus 16 may include components such as hardware, software, a CPU, a memory, and an interface, so as to run a general-purpose program or a special-purpose program, to establish a connection to the network 14 and monitor data transmitted on the network 14. The network monitoring apparatus 16 may further perform other test and measurement operations, perform data sending and receiving operations, and the like.

Figure 2:
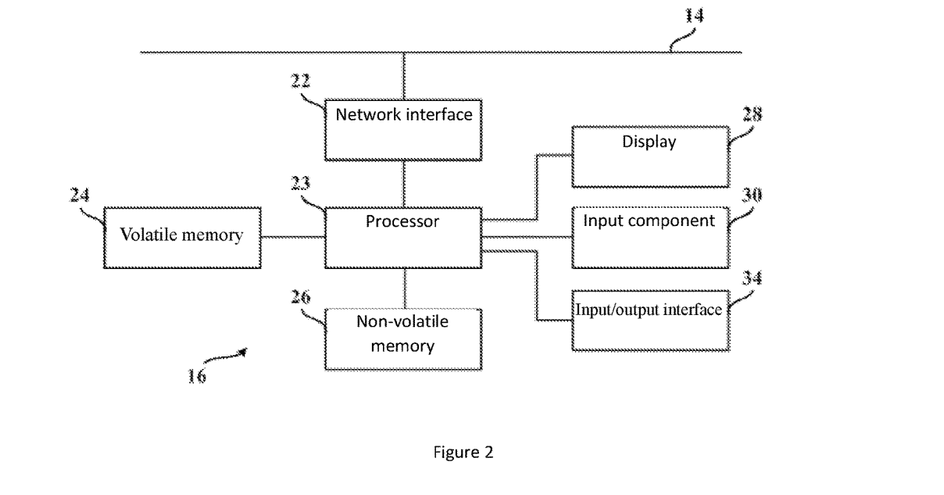
FIG. 2 is a schematic diagram of a network monitoring apparatus 16 according to an embodiment of this application.

FIG. 2 is a schematic diagram of a network monitoring apparatus according to an embodiment of this application.

As shown in FIG. 2, the network monitoring apparatus 16 includes a network interface 22 that connects the network apparatus 16 to the network 14 through one or more ports. The network monitoring apparatus 16 may further include one or more processors 23, one or more volatile memories 24 (such as a dynamic random access memory), and one or more non-volatile memories 26 (such as a hard disk and a flash memory). In some embodiments, the network monitoring apparatus 16 further includes a display 28, a user input component 30, an input/output interface 34 for coupling to an external device, and the like. The network monitoring apparatus 16 may operate based on an operating system stored in the memory 26, for example, the Windows Server™, Mac OS X™, Unix™, Linux™, and FreeBSD™.

Figure 3:
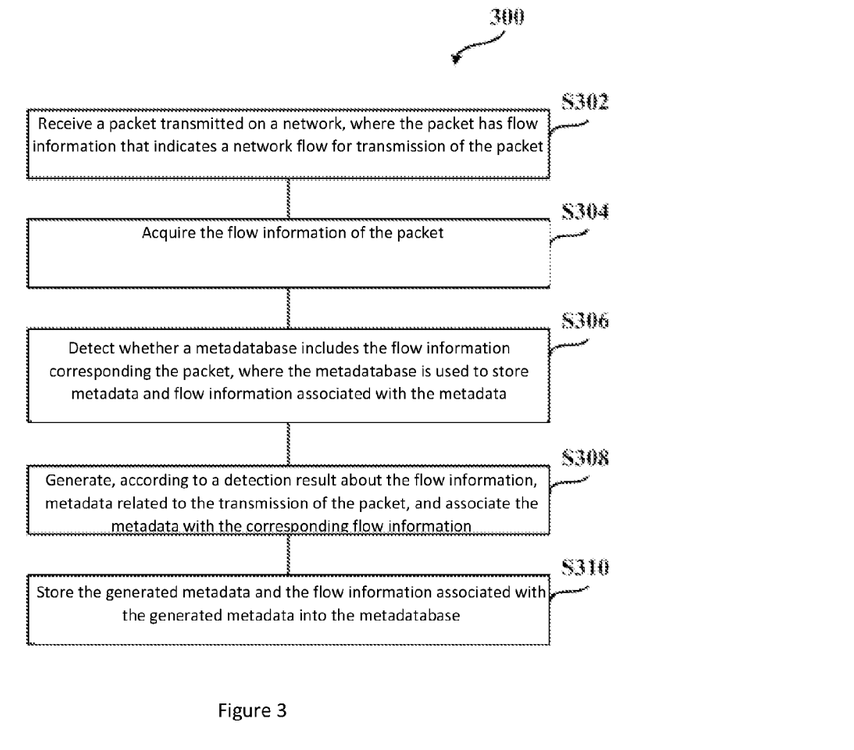
FIG. 3 is a flowchart of a network monitoring method 300 according to an embodiment of this application.

FIG. 3 is a flowchart of a network monitoring method 300 according to an embodiment of this application. The method may be executed by processing logic, and the processing logic may include software (which may be run on a general-purpose or a special-purpose computing device), hardware (such as a circuit and special logic), firmware, or a combination thereof. In some embodiments, the network monitoring method may be executed by the network monitoring apparatus shown in FIG. 2.

As shown in FIG. 3, the network monitoring method 300 begins with step S302, that is, a network monitoring apparatus receives a packet transmitted on a network, where the packet has flow information that indicates a network flow for transmission of the packet. In some embodiments, the flow information may include a source address-destination address pair, or may further include a source poll-destination port pair. According to the source address destination port pair, the network monitoring apparatus may determine the received packet is transmitted between which two coupled network devices on the network; and according to the source port and the destination port, the network monitoring apparatus may further determine the received packet is related to which specific processes on the network devices. In some embodiments, the network monitoring apparatus may store, by establishing one or more look-up tables, the source address-the destination address pair and/or the source port-destination port pair included in the flow information. The look-up table includes multiple address pairs and/or port pairs, where each address pair and/or port pair may be identified by using a flow identifier.

It can be understood that, in actual application, multiple packets are generally transmitted on the network. The network monitoring apparatus receives these packets, and monitor these packets. In other words, the packet received in step S302 may be one of multiple packets received by the network monitoring apparatus, and the network monitoring apparatus may perform the network monitoring method 300 on this packet. In addition, the network monitoring apparatus may also perform the network monitoring method 300 on other received packets.

After that, in step S304, the network monitoring apparatus acquires the flow information of the packet received in step S302.

Generally, the flow information may be included in the header of the packet, for example, the flow information is defined in a predetermined field in the header. Therefore, in some embodiments, the network monitoring apparatus may query the predetermined field in the header of the packet to obtain the corresponding flow information. It can be understood that, according to different sending/receiving network devices, different packets may have different or same flow information. However, the length of a packet is generally limited, for example, a maximum length of an IP packet is 64 k bytes. Therefore, for transmission of a large volume of data between two network devices, the network monitoring apparatus generally can detect hundreds of, thousands of, or even more packets, and these packets have same flow information.

Next, in step S306, the network monitoring apparatus detects whether a metadatabase includes the flow information corresponding to the received packet, where the metadatabase may store metadata and flow information associated with the metadata.

In some embodiments, the metadatabase is a set of metadata and flow information associated with the metadata, and is created by the network monitoring apparatus according to information of packets that have been received. Metadata is information related to transmission of a packet, and includes, for example, information such as a source address-destination address pair, a source port-destination port pair, a source-end sub-network identifier, a destination-end sub-network identifier, a packet flow direction, a service type identifier, a protocol identifier, and/or a VLAN (virtual local area network) identifier, or other information related to data of the packet and/or transmission of the packet (for example, a packet size).

In some embodiments, the network monitoring apparatus may replicate some or all data of a header of a packet, and use the replicated data as metadata of the packet. For example, the network monitoring apparatus may directly replicate data such as a source address, a destination address, a source port, a destination port, an address type, a packet length, and a service type identifier and use the replicated data as a part of metadata. For a packet that uses a specific protocol, these data have certain locations in the packet. Therefore, a predefined data extraction program may be provided in the network monitoring apparatus to obtain metadata.

In some other embodiments, the network monitoring apparatus may further process some or all data in a header of a packet, and use the processed data as metadata of the packet. For example, in a system that uses the TCP/IP protocol, generally, different service ports have been allocated to different applications or services, Generally, port number 53 is allocated to a network system (DNS) to perform domain name resolution; port number 80 is allocated to a hypertext server (HTTP) so that a web server transmits hypertext to a local browser of a network device by using the port number 80; port number 110 is allocated to be used for e-mail transmission, and the like. Therefore, the network monitoring apparatus may include a predetermined conversion function, where the predetermined conversion function may include a port-application or a port-service correspondence defined by the TCP/IP protocol or another network transport protocol. By means of the predetermined conversion function, data of the source port or the destination port n the header of the packet can be converted into a corresponding application identifier, where the application identifier may indicate an application to which the packet can be applied. In some embodiments, as long as one of a source port and a destination port in a header of a packet is a predefined service port, the packet can be provided with or marked with an application identifier corresponding to the service port. Similarly, the network monitoring apparatus may further include other predetermined conversion functions. For example, according to a requirement of actual application, it may be defined that some source addresses or destination addresses belong to a particular domain or some particular domains; and correspondingly, the network monitoring apparatus may provide a predetermined conversion function that includes a correspondence between the source addresses and/or destination addresses and the domains, and by means of this predetermined conversion function, source addresses in headers of packets may be converted into corresponding source do identifiers, while destination addresses in the headers of the packets may be converted into corresponding destination domain identifiers, to separately indicate domains which the packets are from or domains to which the packets are going to be sent. For another example, according to a session between two network devices, the network monitoring apparatus may further define a source address and a destination address of multiple packets related to the session as an address pair, and further determine a master-slave relation between the two network devices, where the network device that sends a packet in the first place is defined as a client (which generally initiates a session to request data), while the network device that receives the packet may be defined as a server (which responds to the request to provide data). Therefore, a source address in a header of the packet sent in the first place may be defined as a client address, and a destination address in the header of the packet sent in the first place may be defined as a server address. Correspondingly, the network monitoring apparatus may construct a conversion function according to the foregoing definition, and covert a source address and a destination address in a header of each packet in this session to be the client address and the server address. Meanwhile, the network monitoring apparatus may further set, in the conversion function, a function for determining a packet flow direction, where the packet flow direction may be from the client to the server (if a source address of a packet is the same as the client address, or a destination address of the packet is the same as the server address), or from the server to the client (if a destination address of a packet is the same as the client address, or a source address of the packet is the same as the server address). The packet flow direction may also be added to metadata. It can be understood that, the foregoing data information included in metadata is merely an example, and according to different specific applications, those skilled in the art may perform various modifications, alterations, and processing on data information included in metadata.

As is described above, metadata in the metadatabase is associated with corresponding flow information, in some embodiments, the flow information may be included in the corresponding metadata. For example, an association between the metadata and the flow information may be established by adding source address-destination address pairs and/or source port-destination port pairs to the corresponding metadata. In some other embodiments, the flow information may be identified by using flow identifiers, for example, a look-up table between the flow information and the flow identifiers may be established. Correspondingly, the association between the metadata and the flow information may be established by adding the flow identifiers to the corresponding metadata, or by creating a look-up table between the flow identifiers and the metadata. Such processing can achieve a same effect as adding the flow information to the metadata. It can be understood that, because the network monitoring apparatus continuously captures or receives new packets from the network, the amount of metadata in the metadatabase may increase continuously.

In addition, because the metadatabase includes a large amount of metadata, the metadatabase may further include a metadata index. The metadata index can facilitate metadata searching or sorting, and can improve metadata searching efficiency.

According to the flow information of the packet obtained in step S304, the network monitoring apparatus may detect whether the metadatabase includes the flow information. In some embodiments, the network monitoring apparatus may query a look-up table between flow information and flow identifiers, to determine whether the metadatabase includes the flow information. The look-up table includes, for example, a correspondence between source address destination address pairs and/or source port-destination port pairs and flow identifiers. If the flow information exists, the network monitoring apparatus may acquire a corresponding flow identifier if the flow information does not exist, the network monitoring apparatus may obtain a return value, such as null (null), indicating nullity or indicating that the flow information does not exist. In some other embodiments, the flow information may not be identified by using flow identifiers, but only expressed by using source address-destination address pairs and/or source port-destination port pairs. The network monitoring apparatus may store all source address-destination address pairs and/or source port-destination port pairs as a look-up table, and update the look-up table after receiving a new source address-destination address pair and/or a new source port-destination port pair. In this way, the network monitoring apparatus can determine, by querying the look-up table, whether the metadatabase includes the flow information.

Next, in step S308, the network monitoring apparatus generates, according to a detection result about the flow information, metadata related to the transmission of the packet.

Specifically, if it is detected that the metadatabase does not include the flow information corresponding to the packet, it indicates that the metadatabase does not include metadata associated with the flow information, and in this case, the network monitoring apparatus extracts, from the packet, data related to the transmission of the packet to generate the metadata. In an embodiment, for a packet from which data is to be extracted, the network monitoring apparatus may replicate at least a part of a header of the packet to obtain the metadata corresponding to the packet, or optionally, the network monitoring apparatus may also process some or all data in the header of the packet, and use processed data as a part of the metadata. In some embodiments, the metadata may include data that is directly replicated from the packet, and data that is obtained by processing data of the packet. Processing on data in the header may be converting at least some data included in the header by using, for example, a predetermined conversion function. For the conversion function, refer to the description above, and details are not described herein again.

On the contrary, if it is detected that the metadatabase includes the flow information corresponding to the detected packet, the network monitoring apparatus may replicate, from the metadatabase, metadata related to the detected flow information, and use the replicated metadata as the metadata of the packet. The foregoing processing manner can be used because a major difference between multiple packets transmitted between two network devices lies in payload data (that is, user data), while information included in headers is substantially the same or is slightly different. Therefore, for multiple packets transmitted between two network devices, generally, metadata obtained by parsing headers of the packets is also the same. Further, two network devices may also be represented by using flow information of packets that are transmitted between the two network devices, and if the packets have the same flow information, metadata corresponding to the packets is also the same. Based on this, if the metadatabase includes the flow information corresponding to the detected packet, it indicates that the metadatabase already includes metadata associated with the flow information, and therefore, the metadata may be used as the metadata of the packet. In this way, the network monitoring apparatus may perform less operations of parsing a packet to obtain metadata, thereby greatly improving metadata generation efficiency. This processing manner is particularly suitable to be applied in high-speed network communication.

In some embodiments, after corresponding metadata is generated for each received packet, the network monitoring apparatus may generate network statistics information for these packets according to the metadata of these packets. In some embodiments, the network statistics information may include a source address and a destination address, a source port and a destination port, a source domain identifier, a destination domain identifier, a service type identifier, a packet flow direction, a protocol identifier, a VLAN identifier, a packet count, and/or a packet size. The network statistics information may be collected based on the flow information, that is, based on a pair of two network devices that communicate with each other. For example, the network statistics information may include the quantity (that is, a count) of packets transmitted in one or more sessions between a pair of network devices, or a size of data included in these packets. All these statistics information may be obtained by setting predetermined statistics functions or statistics rules and processing the metadata by using these statistics functions or rules. The network statistics information may further directly extract some data in the metadata, for example, the protocol identifier, the VLAN identifier, and the service type identifier. In some embodiments, the network statistics information may be buffered in the network monitoring apparatus, for example, buffered in a main memory, and buffered information is stored into a network statistics database at an interval of a predetermined time (for example, 60 seconds).

After that, in step S310, the network monitoring apparatus stores the generated metadata and the flow information associated with the generated metadata into the metadatabase. In this way, each received packet can be allocated with one piece of corresponding metadata.

In some embodiments, if it is detected in step S308 that the metadatabase does not include flow information of a packet, metadata of the packet needs to be generated, and the generated metadata of the packet is associated with the flow information of the packet, for example, a new flow identifier is generated or allocated to represent the new flow information, and the new flow identifier is added to the generated metadata, to associate the new flow information and the new metadata. Further, the newly generated metadata and the flow information associated with the newly generated metadata may be stored in the metadatabase. In addition, if it is detected in step S308 that the metadatabase already includes flow information of a packet, and new metadata is generated by using an operation of, for example, replicating metadata corresponding to the existing flow information, the flow information associated with the new metadata is also certain, and the network monitoring apparatus may store the metadata and the flow information associated with the metadata into the metadatabase.

Through the foregoing steps, the network monitoring apparatus has obtained the metadata corresponding to the received packets, and for these received packets, the network monitoring apparatus may select processing manners according to different specific application requirements. In some embodiments, the network monitoring apparatus may only need to store the metadata, to facilitate subsequent analysis or backtracking on packet transmission status in the network based on the stored metadata. In some other embodiments, the network monitoring apparatus may further store the packet that is received in step S302, and store the received packet in a packet library. Each packet in the packet library may be allocated with a piece of corresponding metadata in a metadatabase, to describe transmission status of the packet. For example, the metadatabase may include a metadata index to index metadata; and the packet library may include a packet index to index packets. The packet index and the metadata index may correspond to each other. For example, the packet index sorts the packets according to a receiving sequence of the packets, and each packet is allocated with a unique corresponding packet sequence number. Correspondingly, the metadata index may sort the metadata according to the sequence numbers of the packets corresponding to the metadata. In this way, when the network monitoring apparatus finds, after analyzing the metadata, that some information is missing (for example, when payload data is missing), the network monitoring apparatus may further find a corresponding packet according to the metadata, and further performs analysis processing on the packet.

It can be understood that, in a high-speed communications network, there are a large quantity of packets transmitted on the network; therefore, the network monitoring apparatus needs to have a sufficient storage speed and storage capacity, to store a large amount of packets and metadata. In some cases, especially, at an excessively high network transmission rate, the network monitoring apparatus may fail to store the received packet and the generated metadata into an internal mass storage medium (such as a hard disk or a flash memory) in time. To avoid or reduce the occurrence of such a case, in some embodiments, a buffer memory may be set for the network monitoring apparatus, so that the metadata generated in step S308, and generated metadata of other packets from the network can be buffered into the buffer memory first, and after a predetermined condition is satisfied, these buffered metadata is transferred to the mass storage medium in the metadatabase. In other words, the metadata of these packets and associated flow information are transferred to the metadatabase in batches. For example, each time the buffer memory is full, or at an interval of a predetermined time, the metadata is transferred to the metadatabase. In some embodiments, the buffered metadata and flow information may be a synchronously transferred from the buffer memory to the metadatabase, that is, the memory in the metadatabase uses an asynchronous input/output manner to store data. Specifically, after the network monitoring apparatus instructs a batch of buffered metadata to be transferred to the memory, before the memory returns a response that indicates whether storage of this batch of metadata is completed, the network monitoring apparatus continues to transfer the next batch of buffered metadata to the memory. The network monitoring apparatus may arrange a particular thread to process the transfer and storage of metadata, and arrange another one or more threads to detect whether transferred metadata is stored successfully. For a metadatabase that uses a hard disk memory, the foregoing asynchronous storage operation can enable a head to continuously write data into a same area or neighboring areas of a hard disk, to avoid frequent addressing that affects a data write speed.

As is described above, the maximum length of each IP packet is 64 k bytes. For transmission of a large volume of data between two network devices, the network monitoring apparatus generally can detect hundreds of, thousands of, or even more packets, and these packets have same flow information, To improve packet processing efficiency, in some embodiments, multiple packets are packaged into a group of packets, for example, 64, 128, 256 or more packets are packaged into a group of packets. The group of packets may be transmitted together, and received and processed by the network monitoring apparatus, where ach group of packets may include a data block header, so that information about the group of packets and transmission of the group of packets is added to the data block header. Correspondingly, multiple pieces of corresponding metadata may also be packaged into a group of metadata, and a metadata block header is provided. In some embodiments, a block tag may be added to the data block header, and the block tag is used to represent that each packet in the group of packets is allocated with corresponding metadata. The use of a block tag facilitates subsequent processing on packets and metadata. For example, when the network monitoring apparatus performs subsequent processing on received and stored packets, the network monitoring apparatus may detect whether a data block header in each group of packets has a block tag; if the data block header has the block tag indicating that each packet in the group of packets is allocated with metadata, the network monitoring apparatus may choose to process a group of metadata corresponding to the group of packets, for example, analyze and filter the metadata; otherwise, if the data block header does not have the block tag indicating that each packet in the group of packets is allocated with metadata, the network monitoring apparatus may choose to process the group of packets, for example, perform data analysis and filtering on the packets.

It can be seen that, in the network monitoring method according to this application, packet transmission is described by using metadata, and a size of the metadata is generally much smaller than a packet size. When packets need to be monitored, for example, when statistics about information such as transmission status of the packets are collected or packets are filtered according to a particular algorithm, generally, the network monitoring apparatus may process the metadata only, and does not need to or rarely needs to process the packets directly. Such a data analysis processing manner significantly reduces the difficulty of analysis processing on network packets, thereby improving the efficiency and reliability of network monitoring.

This application further provides a method for filtering packets and metadata that are obtained by using the foregoing network monitoring method. After the filtering, packets and/or metadata that meet a filter criterion and requirement can be recovered, and can be compiled or organized to form a data file for subsequent use.

Figure 4:
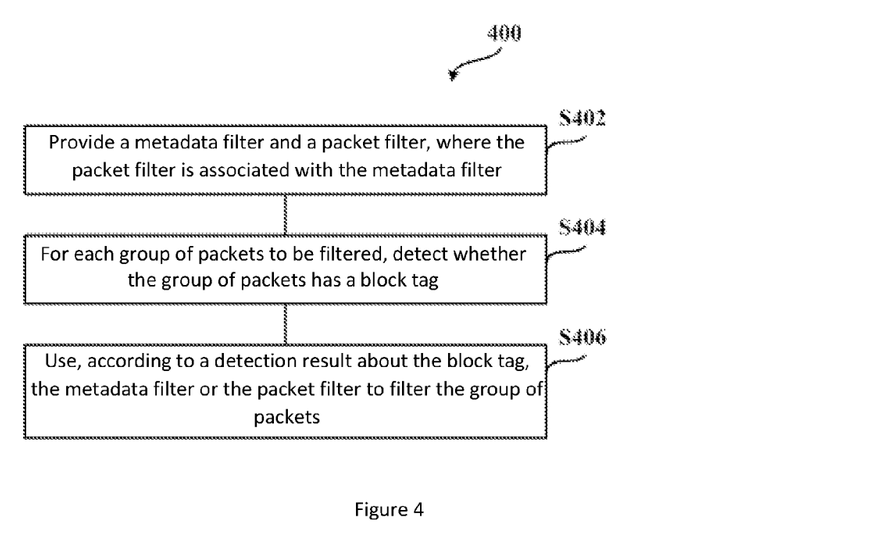
FIG. 4 shows a method 400 for filtering at least one group of packets transmitted on a network according to an embodiment of this application.

FIG. 4 shows a method 400 for filtering at least one group of packets transmitted on a network according to an embodiment of this application. The method 400 may be executed by, for example, the network monitoring apparatus shown in FIG. 2, or executed by a similar data processing apparatus.

As shown in FIG. 4, in step S402, a metadata filter and a packet filter are provided, where the packet filter is associated with the metadata filter.

Specifically, data to be filtered is packets that are generally received by the network monitoring apparatus and are stored in a packet library. Some or all of these packets are allocated with corresponding metadata, and the metadata is stored in a metadatabase. In some embodiments, the packets may be stored in the packet library group by group, and each group of packets may include a data block header; similarly, the metadata may be stored in the metadatabase group by group, and each group of metadata may include a metadata block header.

Each group of packets may include a block tag, where the block tag is used to indicate that the group of packets is allocated with metadata that is related to transmission of each packet in the group. In other words, if any one or more packets in a group of packets do not have corresponding metadata, the group of packets may not have a block tag, or a block tag may be set to indicate that a lack of corresponding metadata. In some embodiments, the block tag may be added to the data block header. In some other embodiments, the block tag may also be added to a packet block index.

The metadata filter generally includes some predetermined filter criteria, and these filter criteria correspond to data included in the metadata. For example, the metadata may include, for example, an application identifier that indicates an application which the packet corresponding to the metadata is applicable to different application identifiers may be allocated with different values. For the application identifier, refer to the related description in the network monitoring method shown in FIG. 3. Correspondingly, the metadata filter may include one or more specific application identifier values, and when a value of the application identifier in the metadata is the same as the value in the metadata filter, it may be considered that the metadata meets the filter criteria; and when the value of the application identifier in the metadata is different from the value in the metadata filter, it may be considered that the metadata does not meet the filter criteria. In some embodiments, metadata that meets the filter criteria may be retained, while metadata that does not meet the filter criteria may be discarded; or on the contrary, metadata that meets the filter criteria is discarded.

In some embodiments, that the packet filter is associated with the metadata filter refers to that the packet filter has at least one filter criterion that is corresponding to and inter convertible with a filter criterion in the metadata filter. For example, it is possible that a packet does not have an application identifier in metadata, but has only a port number of a source port or a port number of a destination port; however, at least one of these port numbers is in one-to-one correspondence with an application. Therefore, the packet filter may include a filter criterion related to a port number, which corresponds to a value of an application identifier in the metadata filter. For example, the filter criterion of the metadata filter may limit that an application identifier of metadata needs correspond to an identifier of DNS. Correspondingly, the filter criterion included in the packet filter may limit that the port number of the destination port or source port is 53. In a network system that uses the TCP/IP protocol, port number 53 is allocated to the network system (DNS) to perform domain name resolution; therefore, the two filter criteria of the packet filter and the metadata filter are the same, so that the two filters perform substantially same data filtering operations. In actual application, the packet filter and the metadata filter may be constructed according to a data correspondence between metadata and packets.

Next, in step S404, it is detected whether each group of packets to be filtered has a block tag.

As is described above, the block tag may be added to a data block header or may be added to a packet block index. Therefore, for each group of packets, a block tag may be searched for and detected in the data block header and or the packet block index.

After that, in step S406, according to a detection result about the block tag, the metadata filter or the packet filter is used to filter the packets.

Specifically, if it is detected that a group of packets is allocated with a group of metadata, the metadata filter is used to filter the group of packets, and specifically, to filter the metadata corresponding to the group of packets; and if it is detected that a group of packets is not allocated with a group of metadata, the packet filter is used to filter the group of packets.

In some embodiments, after step S406, filtered packets may further be acquired, to generate a data file that includes these filtered packets. For example, for packets that are filtered by using the packet filter, the packets may be directly transferred to a predetermined storage location or buffered while being filtered; and for packets that are filtered by using the metadata, based on metadata that is obtained by means of filtering, corresponding packets may further be read from the packet library, and then, these packets are transferred to a predetermined storage location or buffered. After such processing, packets that meet the filter criterion of the metadata filter or the filter criterion of the packet filter can be obtained. These packets may be compiled or organized to form a data file for subsequent use.

In some embodiments, packets received from the network may also be filtered one by one. Correspondingly, for each packet to be filtered, it is detected whether the packet has corresponding metadata. Then, according to a detection result about the metadata, the metadata filter or the packet filter is used to filter the received packet. In some embodiments, metadata included in the metadatabase may be filtered first, and then packets that are included in the packet library and do not have metadata are filtered.

Figure 5:
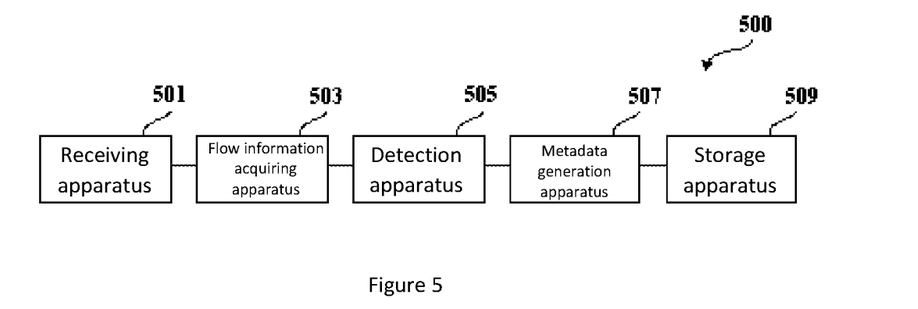
FIG. 5 is a schematic diagram of a network monitoring apparatus 500 according to an embodiment of this application.

FIG. 5 is a schematic diagram of a network monitoring apparatus 500 according to an embodiment of this application.

As shown in FIG. 5, the network monitoring apparatus 500 includes:

a receiving apparatus 501, configured to receive a packet transmitted on a network, where the packet has flow information that indicates a network flow for transmission of the packet;

a flow information acquiring apparatus 503, configured to acquire the flow information of the packet;

a detection apparatus 505, configured to detect whether a metadatabase includes the flow information corresponding to the packet, where the metadatabase is used to store metadata and flow information associated with the metadata;

a metadata generation apparatus 507, configured to generate, according to a detection result about the flow information, metadata related to the transmission of the packet, and associate the metadata with the corresponding flow information; and a storage apparatus 509, configured to store the generated metadata and the flow information associated with the generated metadata into the metadatabase.

Figure 6:
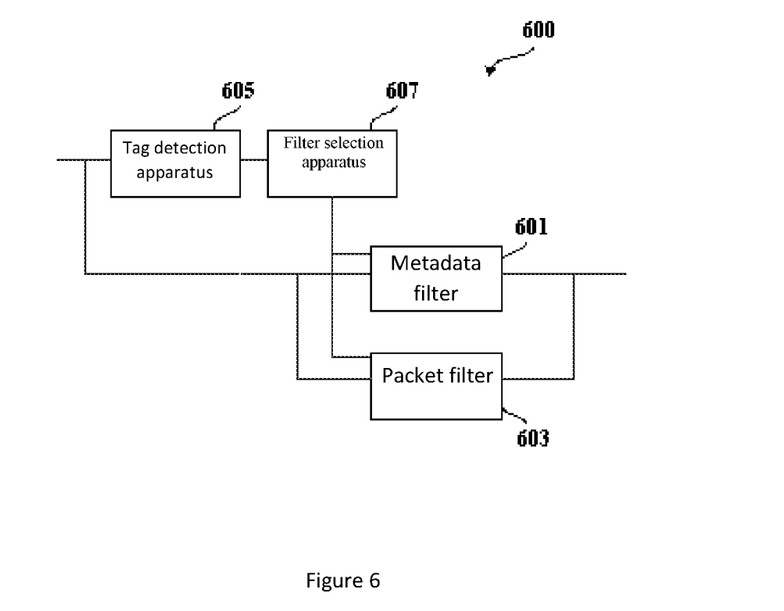
FIG. 6 is a schematic diagram of an apparatus 600 for filtering at least one group of packets transmitted on a network according to an embodiment of this application.

FIG. 6 is a schematic diagram of an apparatus for filtering at least one group of packets transmitted on a network according to an embodiment of this application.

As shown in FIG. 6, the apparatus 600 includes;

a metadata filter 601;

a packet filter 603, where the packet filter 603 is associated with the metadata filter 601;

a tag detection apparatus 605, configured to: for each group of packets in the at least one group of packets, detect whether the group of packets has a block tag, where the block tag indicates that the group of packets is allocated with metadata that is related to transmission of each packet in the group; and a filter selection apparatus 607, configured to use, according to a detection result about the block tag, the metadata filter 601 or the packet filter 603 to filter the at least one group of packets.

In some embodiments of this application, the apparatus 500 shown in FIG. 5 and the apparatus 600 shown in FIG. 6 may be implemented by using one or more application specific integrated circuits (ASIC), a digital signal processor (DSP), a digital signal processing device (DSPD), a programmable logic device (PLD), a field-programmable gate array (FPGA), a controller, a microcontroller, a microprocessor or another electronic element, and may be used to execute the method 300 shown in FIG. 3 or the method 400 shown in FIG. 4.

In some embodiments, this application further provides a non-volatile computer readable storage medium including an instruction, for example, a memory including an instruction, where the foregoing instruction may be executed by the processor 23 of the network monitoring apparatus 16 shown in FIG. 2, to implement the method 300 shown in FIG. 3 or the method 400 shown in FIG. 4, For example, the non-volatile computer readable storage medium may be a ROM, a random access memory (RANI), a CD-ROM, a magnetic tape, a flash memory, a hard disk, a floppy disk, an optical data storage device, or the like.

It should be noted that, although several modules or sub-modules of the network monitoring apparatus in the embodiments of this application are mentioned in the detailed description above, such a division is merely exemplary but not mandatory. In fact, according to the embodiments of this application, features and functions of two or more modules described above may be embodied in one module. On the other hand, the feature and function of one module described above may be further divided to be embodied by multiple modules.

In addition, although operations of the method in this application are described in specific order in the accompanying drawings, it does not require or imply that these operations need to be executed according to the specific order, or imply that a desired result can be realized only when all the operations shown in the accompanying drawings are executed. On the contrary, a sequence of executing the steps shown in the flowchart may be changed. Additionally or optionally, some steps may be omitted, multiple steps may be combined into one step for execution, and/or one step may be divided into multiple steps for execution.

By studying the specification, the disclosed content and accompanying drawings, and the appended claims, those of ordinary skill in the art may comprehend and implement other alterations on the disclosed implementation manners. In the claims, the term "comprise" does not exclude other elements or steps, and the term "one" does not exclude a plurality form. In actual application of the present invention, one component may implement functions of multiple technical features cited in the claims. In the claims, any reference sign of the accompanying drawings should not be construed as a limitation to the scope.

The invention claimed is:

1. A network monitoring method, characterized by comprising:
providing network monitoring apparatus communicatively coupled to a network, wherein the network monitoring apparatus includes:
a buffer memory;
a metadatabase library; and
a processor having instructions to:
receive a packet transmitted on a network, wherein the packet has flow information that indicates a network flow for transmission of the packet;
acquire the flow information of the packet;
detect whether a metadatabase library comprises the flow information corresponding the packet, wherein the metadatabase library is used to store metadata and flow information associated with the metadata;
generate, according to a detection result about the flow information, metadata related to the transmission of the packet, and associating the metadata with the corresponding flow information;
if it is detected that the metadatabase does not comprise the flow information corresponding to the packet, extracting, from the packet, data related to the transmission of the packet to generate the metadata;
if it is detected that the metadatabase comprises the flow information corresponding to the packet, replicating, from the metadatabase, metadata associated with the flow information, and using the replicated metadata as the metadata of the packet;
buffer the generated metadata and the flow information associated with the generated metadata into the buffer memory; and
transfer the generated metadata and the flow information associated with the generated metadata from the buffer memory into the metadatabase library when a predetermined condition is satisfied.

2. The network monitoring method of claim 1, characterized in that, the step of extracting, from the packet, data related to the transmission of the packet to generate the metadata comprises:
replicating and processing at least a part of a header of the packet to obtain the metadata of the packet.

3. The network monitoring method of claim 2, characterized in that, the processing at least a part of a header of the packet comprises converting at least some data comprised in the header of the packet by using one or more predetermined conversion functions.

4. The network monitoring method of claim 1, characterized in that, the associating the metadata with the corresponding flow information comprises: adding the flow information to the generated metadata.

5. The network monitoring method of claim 1, characterized in that, the received packet is one of multiple packets transmitted on the network, and the network monitoring method comprises:
receiving the multiple packets, and generating, according to metadata corresponding to the multiple packets, network statistics information for the multiple packets.

6. The network monitoring method of claim 5, characterized in that, the network statistics information comprises: a source address and a destination address, a source port and a destination port, a source domain identifier, a destination domain identifier, a service type identifier, a packet flow direction, a protocol identifier, a VLAN identifier, a packet count, and a packet size.

7. The network monitoring method of claim 1, characterized in that, the network monitoring method further comprises:
storing the packet in a packet library, wherein the packet is allocated with the corresponding metadata in the metadatabase.

8. The network monitoring method of claim 1, further including:
asynchronously transferring, from the buffer memory into the metadatabase library, the buffered metadata and associated flow information of the packet, and buffered metadata and associated flow information of other packets.

9. The network monitoring method of claim 1, characterized in that, the received packet is one packet in a group of packets transmitted on the network, and the network monitoring method comprises:
receiving the group of packets; and
if each packet in the group of packets is allocated with corresponding metadata in the metadatabase, adding, to the group of packets, a block tag indicating that each packet is allocated with corresponding metadata.

10. The network monitoring method of claim 9, characterized in that, the network monitoring method further comprises:
using a metadata filter to filter the group of packets having the block tag.

11. The network monitoring method of claim 1, characterized in that, the metadata comprises a source address-destination address pair, a source port-destination port pair, a source-end sub-network identifier, a destination-end sub-network identifier, a packet flow direction, a service type identifier, a protocol identifier, an application identifier and a VLAN identifier.

12. The network monitoring method of claim 1, characterized in that, the flow information comprises a source address-destination address pair.

13. The network monitoring method of claim 12, characterized in that, the flow information further comprises a source port-destination port pair.

14. The network monitoring method of claim 1, wherein the predetermined condition is a predetermined time interval.

15. The network monitoring method of claim 1, wherein the predetermined condition includes arranging a thread to process transfer of metadata from the buffer memory to the metadatabase library and then arranging a subsequent thread to process transfer of metadata from the from the buffer memory to the metadatabase library to detect if metadata is stored successfully in the metadatabase library.

16. The network monitoring apparatus of claim 1, wherein the predetermined condition is a predetermined time interval.

17. The network monitoring apparatus of claim 1, wherein the predetermined condition includes arranging a thread to process transfer of metadata from the buffer memory to the metadatabase library and then arranging a subsequent thread to process transfer of metadata from the from the buffer memory to the metadatabase library to detect if metadata is stored successfully in the metadatabase library.

18. A network monitoring apparatus coupled to a network to receive a packet transmitted on the network, wherein the packet has flow information that indicates a network flow for transmission of a packet, comprising:

a buffer memory;
a metadatabase library; and
a processor having instructions to:
receive a packet transmitted on a network, wherein the packet has flow information that indicates a network flow for transmission of the packet;
acquire the flow information of the packet;
detect whether a metadatabase comprises the flow information corresponding the packet, wherein the metadatabase is used to store metadata and flow information associated with the metadata;
generate, according to a detection result about the flow information, metadata related to the transmission of the packet, and associating the metadata with the corresponding flow information;
if it is detected that the metadatabase does not comprise the flow information corresponding to the packet, extracting, from the packet, data related to the transmission of the packet to generate the metadata;
if it is detected that the metadatabase comprises the flow information corresponding to the packet, replicating, from the metadatabase, metadata associated with the flow information, and using the replicated metadata as the metadata of the packet;
buffer the generated metadata and the flow information associated with the generated metadata into the buffer memory; and
transfer the generated metadata and the flow information associated with the generated metadata from the buffer memory into the metadatabase library when a predetermined condition is satisfied.

* * * * *